United States Patent [19]

Orikasa et al.

[11] Patent Number: 4,962,148

[45] Date of Patent: Oct. 9, 1990

[54] THERMOPLASTIC RESIN COMPOSITION AND METHOD FOR PREPARING THE SAME

[75] Inventors: Yuichi Orikasa, Yokohama; Suehiro Sakazume, Fujisawa; Sadahiro Nishimura, Kawasaki; Yoshinori Maki, Chigasaki, all of Japan

[73] Assignees: Nippon Petrochemicals Co., Ltd; Nippon Oil & Fats Co., Ltd., both of Tokyo, Japan

[21] Appl. No.: 242,025

[22] Filed: Sep. 8, 1988

[30] Foreign Application Priority Data

| Sep. 9, 1987 | [JP] | Japan | 62-226161 |
| Oct. 2, 1987 | [JP] | Japan | 62-250174 |
| Oct. 13, 1987 | [JP] | Japan | 62-257682 |
| Dec. 29, 1987 | [JP] | Japan | 62-332281 |
| Feb. 25, 1988 | [JP] | Japan | 63-42593 |

[51] Int. Cl.$^5$ .................... C08L 77/00; C08L 71/04; C08L 69/00; C08L 55/02
[52] U.S. Cl. .................... 524/504; 524/409; 524/436; 525/64; 525/66; 525/67; 525/68; 525/71; 525/78; 525/79; 525/80; 525/85; 525/86
[58] Field of Search .............. 525/64, 66, 67, 68, 525/71, 78, 79, 80, 85, 86; 524/409, 436, 504

[56] References Cited

U.S. PATENT DOCUMENTS

| 4,481,330 | 11/1984 | Ohara | 525/67 |
| 4,520,164 | 4/1985 | Liu | 525/67 |
| 4,753,990 | 6/1988 | Moriya | 525/94 |
| 4,801,645 | 1/1989 | Nishio | 525/68 |
| 4,839,423 | 6/1989 | Moriya | 525/79 |

FOREIGN PATENT DOCUMENTS 177151 4/1986 European Pat. Off. ............ 525/64

*Primary Examiner*—John C. Bleutge
*Assistant Examiner*—David Buttner
*Attorney, Agent, or Firm*—Ostrolenk, Faber, Gerb & Soffen

[57] ABSTRACT

There is here provided a thermoplastic resin composition containing (I) 99 to 1% by weight of a polypropylene, (II) 1 to 99% by weight of at least one kind of resin selected from the group consisting of an aromatic polyester resin, a polycarbonate resin, a polyamide resin, a polyphenylene ether resin or a mixture of the polyphenylene ether resin and a styrene polymer and an ABS resin, and (III) 0.1 to 100 parts by weight, based on 100 parts by weight of the aforesaid resins (I)+(II), of a multi-phase structure thermoplastic resin which is composed of 5 to 95% by weight of a polyolefin and 95 to 5% by weight of a vinyl polymer or copolymer obtained from at least one kind of vinyl monomer, either of both the components being in the state of a dispersion phase having a particle diameter of 0.001 to 10 μm. A method for preparing the above-mentioned thermoplastic resin composition is also provided here.

21 Claims, 2 Drawing Sheets

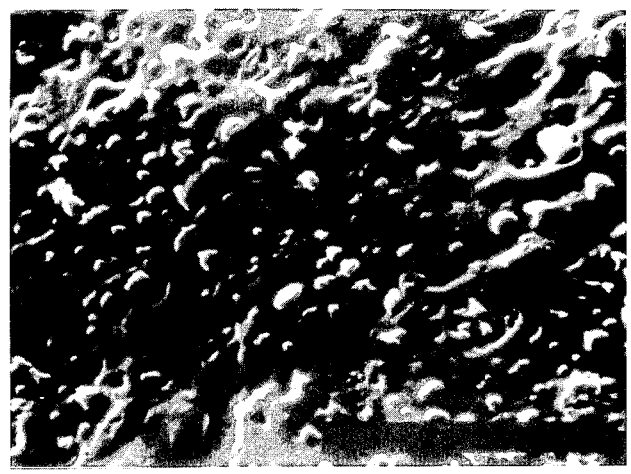
FIG. 1  ⊢—1 μm
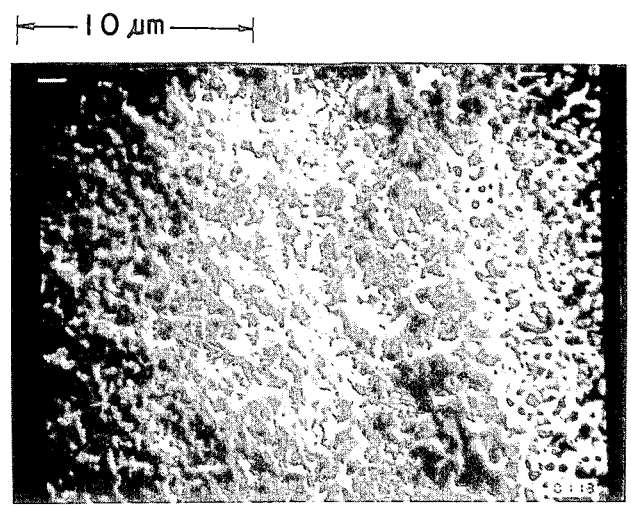
FIG. 2
FIG. 3  ⊢—10 μm

THERMOPLASTIC RESIN COMPOSITION AND METHOD FOR PREPARING THE SAME

BACKGROUND OF THE INVENTION (1) Field of the Invention

The present invention relates to a thermoplastic resin composition having excellent chemical resistance, moldability, impact resistance, heat resistance, coating properties, mechanical properties and appearance of molded articles made therefrom, and a method for preparing the same. This composition of the present case can be widely utilized as materials for electrical and electronic parts, machine parts, automobile parts and the like.

(2) Description of the Prior Art

The so-called engineering plastics such as aromatic polyester resins, polycarbonate resins, polyamide resins and polyphenylene ether resins have excellent mechanical properties, heat resistance, stiffness and impact resistance. Furthermore, ABS resins and polypropylenes are widely used for various molded articles because of having excellent chemical resistance, moldability and the like, and because of being inexpensive.

In recent years, with regard to not only the engineering plastics but also the ABS resins and polypropylenes, new additional functions are demanded, and various attempts have been made to achieve the same. One of them is a composition comprising a combination of plastics, and this composition has features of the respective plastics and is known as a polymer alloy.

For example, combinations of engineering plastics such as an aromatic polyester resin/a polyphenylene ether resin and a polycarbonate resin/an ABS resin have been known for a relatively long time, but examples of polymer alloys of polypropylenes and the engineering plastics are extremely limited. If a material can be provided with mechanical properties, heat resistance, stiffness, impact resistance and coating properties and the like, maintaining moldability and chemical resistance as well as inexpensiveness which are characteristics of the polypropylene, such a material will be industrially useful.

However, the polypropylene and each of such plastics as mentioned above are difficult to mix, and therefore merely by melting and mixing these materials, the polymer alloy cannot be obtained. In Japanese Patent Unexamined Publication Nos. 61-62542 and 61-64741, examples are disclosed in which polyamide resins are blended with a polypropylene, and in Japanese Patent Unexamined Publication Nos. 61-60744 and 61-60746, examples are disclosed in which aromatic polyester resins are blended with a polypropylene. In these examples, acid anhydride-modified polypropylenes and epoxy group-containing ethylene copolymers are used to facilitate the mixing of these resins. In this case, the compatibility of the two resins with each other is higher than when they are simply mixed, but there are drawbacks such as the increase in melting viscosity.

In addition, with regard to resins other than the polyamide resins and aromatic polyesters, examples of improved compatibility have not been present.

SUMMARY OF THE INVENTION

The inventors of the present application have intensively researched to solve the above-mentioned problems, and as a result, they have found that when a specific multi-phase structure thermoplastic resin is used, the compatibility of polypropylene with an aromatic polyester resin, a polycarbonate resin, a polyamide resin, a polyphenylene ether resin or the like can be improved, so that a thermoplastic resin composition can be obtained which retains excellent moldability and chemical resistance of the polypropylene and which additionally has good heat resistance, mechanical properties, stiffness, impact resistance and coating properties.

That is, the first aspect of the present invention is directed to a thermoplastic resin composition containing (I) 99 to 1% by weight of polypropylene, (II) 1 to 99% by weight of at least one kind of resin selected from the group consisting of an aromatic polyester resin, a polycarbonate resin, a polyamide resin, a polyphenylene ether resin or a mixture of the polyphenylene ether resin and a styrene polymer and an ABS resin, and (III) 0.1 to 100 parts by weight, based on 100 parts by weight of the aforesaid resins (I)+(II), of a multi-phase structure thermoplastic resin which is composed of 5 to 95% by weight of a polyolefin and 95 to 5% by weight of a vinyl polymer or copolymer obtained from at least one kind of vinyl monomer, either or both the components being in the state of a dispersion phase having a particle diameter of 0.001 to 10 $\mu$m.

The second aspect of the present invention is directed to a method for preparing a thermoplastic resin composition which comprises the step of melting and mixing a polypropylene (I) and at least one kind of resin (II) selected from the group consisting of an aromatic polyester resin, a polycarbonate resin, a polyamide resin, a polyphenylene ether resin or a mixture of the polyphenylene ether resin and a styrene polymer and an ABS resin, with 1 to 100% by weight of a graft polymerization precursor (A) which is obtained by first adding at least one kind of vinyl monomer, at least one kind of radical polymerizable or copolymerizable organic peroxide and a radical polymerization initiator to an aqueous suspension of a polyolefin, then heating the suspension under such conditions that the decomposition of the radical polymerization initiator does not occur substantially, in order to impregnate the polyolefin with the vinyl monomer, the radical polymerizable or copolymerizable organic peroxide and the radical polymerization initiator, and raising the temperature of this aqueous suspension, when the degree of the impregnation has reached 50% by weight of the original total weight of the vinyl monomer, peroxide and initiator, in order to copolymerize the vinyl monomer with the radical polymerizable or copolymerizable organic peroxide in the polyolefin, 0 to 99% by weight of the polyolefin (B), and 0 to 99% by weight of a vinyl polymer or copolymer (C) obtained by polymerizing at least one kind of vinyl monomer, or alternatively melting and mixing the components (A), (B) and (C) previously at a temperature in the range of 150° to 350° C. in order to form a multi-phase structure thermoplastic resin (III), and then melting and mixing the resin (III) with the resins (I) and (II).

BRIEF DESCRIPTION OF THE DRAWINGS

FIG. 1 is an electron microscope photograph (10,000 magnifications) of a multi-phase structure thermoplastic resin prepared in Preparation Example 1 in which spherical styrene polymer particles having a diameter of 0.3 to 0.7 μm are dispersed in a matrix comprising a polypropylene homopolymer (PP).

FIG. 2 is an electron microscope photograph (5,000 magnifications) of a multi-phase structure thermoplastic resin prepared in Preparation Example 3 in which spherical styrene polymer particles having a diameter of 0.1 to 0.3 μm are dispersed in a matrix comprising ethyleneglycidyl methacrylate (E-GMA).

FIG. 3 is an electron microscope photograph (1,000 magnifications) of a blend composition (Reference Example 1) which is prepared by first blending the polypropylene homopolymer (PP) used in Preparation Example 1 with 30% by weight of polystyrene (PSi) and then mixing them under melting.

DETAILED DESCRIPTION OF THE INVENTION

The polypropylene (I) used in the present invention is a crystallizable polypropylene, and examples of the polypropylene include, in addition to the homopolymer of the propylene, block and random copolymers of the propylene and α-olefins such as ethylene and butene-1.

The aromatic polyester used in the present invention is a polyester having an aromatic ring on a chain unit thereof, and it is a polymer or copolymer obtained by subjecting, to condensation reaction, an aromatic dicarboxylic acid (or its ester-forming derivative) and a diol (or its ester-forming derivative) as main components.

Examples of the aromatic dicarboxylic acid mentioned above include terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyldicarboxylic acid, 4,4'-diphenyl ether dicarboxylic acid, 1,2-bis(phenoxy)ethane-4,4'-dicarboxylic acid, and ester-forming derivatives thereof.

Examples of the above-mentioned diol component include aliphatic diols having 2 to 10 carbon atoms, i.e., ethylene glycol, propylene glycol, 1,4-butanediol, neopentyl glycol, 1,5-pentanediol, 1,6-hexanediol, decamethylene glycol and cyclohexanediol; long-chain glycols each having a molecular weight of 400 to 6,000, i.e., polyethylene glycol, poly(1,3-propylene glycol) and polytetramethylene glycol; and mixtures thereof.

Typical and preferable examples of the thermoplastic aromatic polyester resin used in the present invention include polyethylene terephthalate, polypropylene terephthalate, polybutylene terephthalate, polyhexamethylene terephthalate, polyethylene-2,6-naphtalate and polyethylene-1,2-bis(phenoxy)ethane-4,4'-dicarboxylate. Of these examples, polyethylene terephthalate and polybutylene terethphalate are more preferable.

The intrinsic viscosity of the thermoplastic aromatic polyester resin is preferably in the range of 0.4 to 4.0 dl/g at 25±0.1° C. at a concentration of 0.32 g in 100 milliliters of trifluoric acid (25)/methylene chloride (75). When the intrinsic viscosity is less than 0.4 dl/g, the thermoplastic aromatic polyester resin cannot exert mechanical strength sufficiently. Inversely, when it is in excess of 4.0 dl/g, the flowability of the resin deteriorates, which leads to the decline of the surface gloss on molded articles thereof.

The polycarbonate resins used in the present invention include 4,4-dioxyallylalkane polycarbonates typified by a polycarbonate of 4,4-dihydroxydiphenyl-2,2-propane (generally called bisphenol A), but above all, 4,4-dihydroxydiphenyl-2,2-propane polycarbonate having a number average molecular weight of 15,000 to 80,000 is preferable. This polycarbonate may be prepared by an optional method. For example, 4,4-dihydroxydiphenyl-2,2-propane polycarbonate may be prepared by blowing phosgene in 4,4-dihydroxydiphenyl-2,2-propane as a dioxine compound in the presence of an aqueous caustic alkali solution and a solvent, or alternatively by carrying out ester interchange between 4,4-dihydroxydiphenyl-2,2-propane and diester carbonate in the presence of a catalyst.

The polyphenylene ether resin used in the present invention is a polymer obtained by oxidizing and polymerizing a phenolic compound represented by the general formula

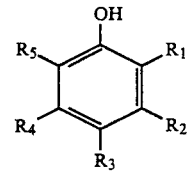

wherein each of $R_1$, $R_2$, $R_3$, $R_4$ and $R_5$ is selected from the group consisting of a hydrogen atom, a halogen atom, a hydrocarbon group or a substituted hydrocarbon group, and at least one of them is a hydrogen atom, with oxygen or an oxygen-containing gas in the presence of a coupling catalyst.

Typical examples of $R_1$, $R_2$, $R_3$, $R_4$ and $R_5$ in the above-mentioned general formula include hydrogen, chlorine, fluorine, iodine, bromine, methyl, ethyl, propyl, butyl, chloroethyl, hydroxyethyl, phenylethyl, benzyl, hydroxymethyl, carboxyethyl, methoxycarbonylethyl, cyanoethyl, phenyl, chlorophenyl, methylphenyl, dimethylphenyl and ethylphenyl.

Typical examples of the phenolic compounds having the above-mentioned general formula include phenol, o-, m- and p-cresols, 2,6-, 2,5-, 2,4- and 3,5-dimethylphenols, 2-methyl-6-phenylphenol, 2,6-diphenylphenol, 2,6-dimethylphenol, 2-methyl-6-ethylphenol, and 2,3,5-, 2,3,6- and 2,4,6-trimethylphenols. These phenolic compounds may be used in combination of two or more thereof.

Other examples of the phenolic compound used in the present invention include copolymers of the phenolic compounds having the above general formula with divalent phenols such as bisphenol A, tetrabromobisphenol A, resorcin and hydroquinone.

Examples of the styrene polymer used in the present invention include homopolymers such as polystyrene, poly(α-methylstyrene) and poly(p-methylstyrene), polystyrenes modified with butadiene rubber, styrene-butadiene copolymer, styrene modified ethylene-propylene copolymer and ethylene-propylene-diene copolymer, styrene-maleic anhydride copolymer, styrene-acrylonitrile copolymer, styrene-acrylonitrile-butadiene copolymer and styrene-methylmethacrylate copolymer. The styrene copolymer is used in an amount of 0 to 95% by weight with respect to the polyphenylene ether resin.

Examples of a polyamide resin used in the present invention include aliphatic polyamide resins such as 6-nylon, 6,6-nylon, 6,10-nylon, 6,12-nylon, 11-nylon, 12-nylon and 4,6-nylon; aromatic polyamide resins such as polyhexamethylenediamine terephthalamide, polyhexamethylenediamine isophthalamide and xylene group-containing polyamide; modified compounds of these polyamides; and mixtures thereof. The particularly preferable polyamides are 6-nylon and 6,6-nylon.

The ABS resin used in the present invention is a graft copolymer (a) obtained by polymerizing, in the presence of a conjugated diene rubber, two or more compounds selected from the group consisting of vinyl cyanide compounds, aromatic vinyl compounds and alkyl ester compounds of unsaturated carboxylic acids. If desired, the ABS resin may contain a copolymer (b) obtained by polymerizing two or more compounds selected from the group consisting of vinyl cyanide compounds, aromatic vinyl compounds and alkyl ester compounds of unsaturated carboxylic acids.

The composition ratio between the conjugated diene rubber and the above-mentioned compound in the graft copolymer (a) is not particularly limited, but the preferable composition ratio is 5 to 80% by weight of the conjugated diene rubber and 95 to 80% by weight of the above-mentioned compound. Furthermore, the composition ratio among the respective compounds mentioned above is preferably 0 to 30% by weight of the vinyl cyanide compound, 30 to 80% by weight of the aromatic vinyl compound and 0 to 70% by weight of the alkyl ester compound of an unsaturated carboxylic acid. With regard to the particle diameter of the conjugated diene rubber, it is not particularly limited, but preferably it is in the range of 0.05 to 1 $\mu$m.

In the case of the copolymer (b), the preferable composition ratio of the respective compounds is 0 to 30% by weight of the vinyl cyanide compound, 50 to 90% by weight of the aromatic vinyl compound and 0 to 40% by weight of the alkyl ester of an unsaturated carboxylic acid. The intrinsic viscosity [30° C., dimethylformamide (DMF)]of the copolymer (b) is not particularly limited either, but it is preferably in the range of 0.25 to 1.0.

Examples of the conjugated diene rubber include polybutadienes, butadiene-styrene copolymers and butadieneacrylonitrile copolymers.

Moreover, examples of the vinyl cyanide compound include acrylonitrile and methacrylonitrile; examples of the aromatic vinyl compound include styrene, $\alpha$-methylstyrene, vinyltoluene, dimethylstyrene and chlorostyrene; and examples of the alkyl ester compound of an unsaturated carboxylic acid include methyl acrylate, ethyl acrylate, butyl acrylate, methyl methacrylate and hydroxyethyl acrylate.

The ABS resin may be prepared in accordance with, for example, an emulsion polymerization process, a suspension polymerization process, a solution polymerization process, a mass polymerization process or an emulsion-suspension polymerization process.

The multi-phase structure thermoplastic resin (III) used in the present invention is a polyolefin or a vinyl polymer or copolymer matrix in which another vinyl polymer or copolymer or polyolefin is uniformly dispersed in a spherical form.

The polyolefin mentioned above is at least one copolymer selected from the group consisting of a propylene polymer and/or an epoxy group-containing ethylene copolymer, an ethylene-unsaturated carboxylic acid or its alkyl ester copolymer, or its metallic salt, and an ethylene-vinyl ester copolymer.

The propylene polymer may be different from the above-mentioned polypropylene (I), and examples of the propylene polymer include the homopolymer of propylene, block and random copolymers of propylene and, for example, $\alpha$-olefins such as ethylene and butene-1, ethylene-propylene copolymer rubber, and ethyelene-propylene-diene copolymer rubber.

In particular, when the aromatic polyester and polyamide are used, it is preferred that not only the propylene polymer but also the ethylene copolymer is employed as the additional polyolefin, because the compatibility of the polyolefins with the aromatic polyester and polyamide can be remarkably improved. Above all, the epoxy group-containing ethylene copolymer reacts with the aromatic polyester and polyamide, and therefore its effect is surprising.

The polymer dispersed in the multi-phase structure thermoplastic resin has a particle diameter of 0.001 to 10 $\mu$m, preferably 0.01 to 5 $\mu$m. When the particle diameter of the dispersed polymer is less than 0.001 $\mu$m or is more than 10 $\mu$m, the compatibility of the polypropylene (I) with the resin (II), for example, the above-mentioned aromatic polyester is bad, with the result that impact resistance deteriorates.

The vinyl polymer or copolymer in the multi-phase thermoplastic resin (III) used in the present invention has a number average polymerization degree of 5 to 10,000, preferably 10 to 5,000.

When the number average polymerization degree is less than 5, impact resistance of the thermoplastic resin composition regarding the present invention can be improved, but heat resistance deteriorates. Inversely, when it is in excess of 10,000, melting viscosity is high, moldability deteriorates, and surface gloss falls off.

The multi-phase thermoplastic resin (III) used in the present invention comprises 5 to 95% by weight, preferably 20 to 90% by weight, of the polyolefin. Therefore, the content of the vinyl polymer or copolymer is 95 to 5% by weight, preferably 80 to 10% by weight.

When the polyolefin is less than 5% by weight, its compatible effect with the polypropylene is not exerted sufficiently, and when it is more than 95% by weight, heat resistance and dimensional stability of the thermoplastic resin regarding the present invention are impaired.

The ethylene copolymer in the multi-phase structure thermoplastic resin used in the present invention is at least one ethylene copolymer selected from the group consisting of an epoxy group-containing copolymer, an ethylene-unsaturated carboxylic acid or its alkyl ester copolymer, or its metallic salt, and an ethylene-vinyl ester copolymer. This ethylene copolymer can be preferably prepared by a high-pressure radical polymerization.

The epoxy group-containing ethylene copolymer mentioned above is a copolymer of ethylene and an unsaturated glycidyl group-containing monomer, a three-dimensional copolymer of an olefin, an unsaturated glycidyl group-containing monomer and another unsaturated monomer, or a multi-dimensional copolymer. The preferable epoxy group-containing ethylene copolymer is composed of 60 to 99.5% by weight of ethylene, 0.5 to 40% by weight of a glycidyl group-containing monomer and 0 to 39.5% by weight of the other unsaturated monomer.

Examples of the unsaturated glycidyl group-containing monomer include glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, vinyl glycidyl ethers and glycidyl esters of maleic acid, crotonic acid and fumaric acid, allyl glycidyl ether, glycidyloxy ethylvinyl ether, glycidyl ethers such as styrene p-glycidyl ether, and p-glycidyl styrene. The particularly preferable ones are glycidyl methacrylate and allyl glycidyl ether.

Other examples of the unsaturated monomers include olefins, vinyl esters, $\alpha,\beta$-ethylenic unsaturated carboxylic acids and their derivatives. Typical examples of such unsaturated monomers include olefins such as propylene, butene-1, hexene-1, decene-1, octene-1 and styrene, vinyl esters such as vinyl acetate, vinyl propionate and vinyl benzoate, acrylic acid, methacrylic acid, esters such as methyl, ethyl, propyl, butyl, 2-ethylhexyl, cyclohexyl, dodecyl and octadecyl acrylates and methacrylates, maleic acid, maleic anhydride, itaconic acid, fumaric acid, maleic monoesters and diesters, vinyl ethers such as vinyl chloride, vinyl methyl ether and vinyl ethyl ether, and acrylic amide compounds. Particularly, acrylic and methacrylic esters are preferable.

Typical examples of the epoxy group-containing ethylene copolymer include ethylene-glycidyl methacrylate copolymer; ethylene-vinyl acetate-glycidyl methacrylate copolymer; ethylene-ethyl acrylate-glycidyl methacrylate copolymer; ethylene-carbon monoxide-glycidyl methacrylate copolymer; ethylene-glycidyl acrylate copolymer; and ethylene-vinyl acetate-glycidyl acrylate copolymer. Above all, ethyleneglycidyl methacrylate copolymer, ethylene-ethyl acrylateglycidyl methacrylate copolymer and ethylene-vinyl acetateglycidyl methacrylate copolymer are preferred. These epoxy group-containing olefin copolymers can be used in a mixture thereof.

Additional examples of the epoxy group-containing ethylene copolymer of the present invention include modified compounds prepared by the addition reaction of the above-mentioned unsaturated glycidyl group-containing monomers to conventional olefin homopolymers and copolymers.

Examples of the above-mentioned ethylene polymer include low-density, medium-density and high-density polyethylenes, ethylene-propylene copolymer, ethylene-butene-1 copolymer, ethylene-hexene-1 copolymer, ethylene-4-methylpentene-1 copolymer, copolymers with other $\alpha$-olefins mainly comprising ethylene such as ethylene-octene-1 copolymer, ethylene-vinyl acetate copolymer, ethyleneacrylic acid copolymer, ethylene-methacrylic acid copolymer copolymers of ethylene and methyl, ethyl, propyl, isopropyl and butyl acrylate and methacrylate, ethylene-maleic acid copolymer, ethylene-propylene copolymer rubber, ethylene-propylene-diene-copolymer rubber, ethylene-vinyl acetate-vinyl chloride copolymer, mixtures thereof, and mixtures of these compounds with other kinds of synthesized resins and rubbers.

Examples of an unsaturated carboxylic acid as well as its alkyl ester and vinyl ester monomers for the ethylene-unsaturated carboxylic acid or its alkyl ester copolymer, or its metallic salt, and the ethylene-vinyl ester copolymer include unsaturated carboxylic acids such as acrylic acid, methacrylic acid, maleic acid, fumaric acid, maleic anhydride and itaconic anhydride; unsaturated alkyl carboxylate monomers such as methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, lauryl methacrylate, stearyl acrylate, stearyl methacrylate, monomethyl maleate, monoethyl maleate, diethyl maleate and monomethyl fumarate; and vinyl ester monomers such as vinyl propionate, vinyl acetate, vinyl caproate, vinyl caprylate, vinyl laurate, vinyl stearate and vinyl trifluoroacetate. Of these compounds, ethyl acrylate and vinyl acetate are particularly preferable. The above-mentioned monomers can be used in the form of a mixture thereof.

Furthermore, in the ethylene polymer used in the present invention, an ion-crosslinked ethylene copolymer (ionomer) is also included, and the ion-crosslinked ethylene copolymer may be prepared by reacting a metallic compound having a valence of 1 to 3 in the groups I, II, III, IV-A and VI of the periodic table with a modified copolymer obtained by the addition polymerization of the above-mentioned unsaturated carboxylic acid such as acrylic acid, maleic acid or maleic anhydride to a low-density, medium-density or high-density polyethylene or ethylene-$\alpha$-olefin copolymer, or with the above-mentioned modified copolymer obtained by random or addition polymerization.

Preferable examples of the metallic compound include borates, acetates, oxides, hydroxides, methoxides, ethoxides, carbonates and bicarbonates. Examples of the metallic ion include $Na^+$, $K^+$, $Ca^{++}$, $Mg^{++}$, $Zn^{++}$, $Ba^{++}$, $Fe^{++}$, $Fe^{+++}$, $Co^{++}$, $Ni^{++}$ and $Al^{+++}$. Of these ions, $Na^+$, $Mg^{++}$ and $Zn^{++}$ are particularly preferable. These metallic compounds may be used in a combination of two or more thereof, if necessary.

The ethylene copolymer may be prepared by a high-pressure radical polymerization, i.e., by simultaneously or stepwise contacting and polymerizing a monomer mixture of 60 to 99.5% by weight of the above-mentioned ethylene, 0.5 to 40% by weight of one or more unsaturated glycidyl group-containing monomer, and 0 to 39.5% by weight of at least one other unsaturated monomer, or a monomer mixture of 50 to 99.5% by weight of ethylene, 50 to 0.5% by weight of at least one monomer selected from the group consisting of an unsaturated carboxylic acid, its alkyl ester and/or a vinyl ester and 0 to 49.5% by weight of another unsaturated monomer in the presence of 0.0001 to 1% by weight of a radical polymerization initiator based on the total weight of all the monomers at a polymerization pressure of 500 to 4,000 kg/cm$^2$, preferably 1,000 to 3,500 kg/cm$^2$, at a reaction temperature of 50 to 400° C., preferably 100 to 350° C., using a chain transfer agent and, if necessary, some auxiliaries in an autoclave or tubular reactor.

Examples of the above-mentioned radical polymerization initiator include usual initiators such as peroxides, hydroperoxides, azo-compounds, amine oxide compounds and oxygen.

Examples of the chain transfer agent include hydrogen, propylene, butene-1, saturated aliphatic hydrocarbons having 1 to 20 carbon atoms such as methane, ethane, propane, butane, isobutane, n-hexane, n-heptane and cycloparaffins; halogen-substituted hydrocarbons such as chloroform and carbon tetrachloride; saturated aliphatic alcohols such as methanol, ethanol, propanol and isopropanol; saturated aliphatic carbonyl compounds having 1 to 20 or more carbon atoms such as carbon dioxide, acetone and methyl ethyl ketone; and aromatic compounds such as toluene, diethylbenzene and xylene.

Typical examples of the vinyl polymer and copolymer in the multi-phase structure thermoplastic resin (III) used in the present invention include polymers and copolymers prepared by polymerizing one or more of vinyl monomers such as vinyl aromatic monomers, for example, styrene, nucleus-substituted styrenes such as methylstyrene, dimethylstyrene, ethylstyrene, isopropylstyrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate; acrylamide and methacrylamide monomers; and monoesters and diesters of maleic anhydride and maleic acid. Above all, the vinyl polymer and copolymer containing 50% by weight or more of a vinyl aromatic monomer are particularly preferable.

As a grafting technique used to prepare the multiphase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

Water is suspended in 100 parts by weight of a polyolefin. Afterward, 5 to 400 parts by weight of at least one vinyl monomer is added to the suspension, and in the mixture, a solution is added in which there are dissolved 0.1 to 10 parts by weight, based on 100 parts by weight of the vinyl monomer, of one or a mixture of radical polymerizable or copolymerizable organic peroxides represented by the undermentioned general formula (a) or (b) and 0.01 to 5 parts by weight, based on 100 parts by weight of the total of the vinyl monomer and the radical polymerizable or copolymerizable organic peroxide, of a radical polymerization initiator in which the decomposition temperature to obtain a half-life period of 10 hours is from 40° to 90° C.. The mixture is then heated under conditions that the decomposition of the radical polymerization initiator does not occur substantially, in order to impregnate the polyolefin with the vinyl monomer, the radical polymerizable or copolymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the polyolefin, thereby obtaining a graft polymerization precursor (A).

This graft polymerization precursor (A) also is the multi-phase structure thermoplastic resin.

Therefore, in order to obtain the thermoplastic resin composition of the present invention, this graft polymerization precursor may be directly mixed under melting with at least one resin (II) selected from the group consisting of a polypropylene, an aromatic polyester resin, a polycarbonate resin, a polyamide resin, a polyphenylene ether resin alone or a mixture of the polyphenylene ether resin and a styrene polymer, and an ABS resin, but in the best case, the multi-phase thermoplastic resin (III) obtained by kneading the graft polymerization precursor is mixed with a polypropylene and the resin (II).

The above-mentioned radical polymerizable or copolymerizable organic peroxides are compounds represented by the general formulae (a) and (b):

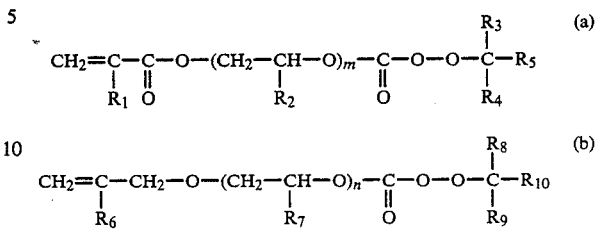

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

Typical examples of the radical polymerizable or copolymerizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylperoxyacryloyloxyethyl carbonate, t-butyl peroxymethacryloyloxyethyl carbonate, t-amylperoxymethacryloyloxyethyl carbonate, 1,1,3,3-tetramethylbutylperoxymethacryloyloxyethyl carbonate, cumylperoxymethacryloyloxyethyl carbonate, p-isopropylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumylperoxyacryloyloxyethoxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylperoxymethacryloyloxyethoxyethyl carbonate, t-butylperoxyacryloyloxyisopropyl carbonate, t-amylperoxymacryloyloxyisopropyl carbonate, t-hexylperoxyacryloyloxyisopropyl 1,1,3,3-tetramethylbutylperoxyacryloyloxyisopropyl carbonate, cumylperoxyacryloyloxyisopropyl carbonate, p-isopropylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylperoxymethacryloyloxyisopropyl carbonate.

Typical examples of the compounds represented by the general formula (b) include t-butylperoxyallyl carbonate, t-amylperoxyallyl carbonate, t hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In the present invention, the amounts of the above-mentioned resins (I) and (II) depend upon the purpose of the composition of the present invention. That is, when it is desired that features of the polypropylene (I) are retained and poor stiffness, heat resistance and dimensional stability which are drawbacks of the polypropylene (I) are improved, there is required 50 to 99% by weight, preferably 60 to 95% by weight, of the polypropylene.

When the polypropylene is less than 50% by weight, excellent moldability and chemical resistance which are features of the polypropylene are impaired, and when it is in excess of 99% by weight, the improvement effect of stiffness, heat resistance and dimensional stability which is one of the purposes of the present invention is not obtained.

On the other hand, if it is intended that physical properties are improved by the polypropylene, maintaining features of the resin (II), the content of the resin (II) is suitably from 50 to 99% by weight.

That is, if it is desired that low notched impact strength which is the drawback of the aromatic polyester resin is improved, maintaining other features thereof, it is necessary that the content of the aromatic polyester resin is from 50 to 99% by weight, preferably from 60 to 95% by weight. When the content of the aromatic polyester resin is less than 50% by weight, stiffness and dimensional stability which are features of the aromatic polyester resin are impaired.

If it is desired that chemical resistance and moldability are improved, retaining other features of the polycarbonate, there is required 50 to 99% by weight, preferably 60 to 95% by weight, of the polycarbonate.

When the amount of the polycarbonate is less than 50% by weight, excellent impact resistance and stiffness which are the features of the polycarbonate is impaired, and when it is in excess of 99% by weight, the improvement effect of chemical resistance and moldability which is one of the purposes of the present invention is not obtained.

If it is desired that features of the polyphenylene ether are retained and the poor moldability and chemical resistance which are drawbacks of the polyphenylene ether are improved, there is required 50 to 99% by weight, preferably 60 to 95% by weight, of the polyphenylene ether.

When the amount of the polyphenylene ether is less than 50% by weight, heat resistance and dimensional stability of the polyphenylene ether are impaired, and when it is in excess of 99% by weight, the improvement effect of moldability and chemical resistance which is one of the purposes of the present invention is not obtained.

When it is desired that poor hygroscopicity and dimensional stability of the polyamide resin are improved, retaining other features thereof, 50 to 99% by weight, preferably 60 to 95% by weight of the polyamide resin is necessary.

When the polyamide resin is less than 50% by weight, the features of the polyamide resin are impaired, and when it is in excess of 99% by weight, the improvement effect of hygroscopicity and dimensional stability thereof which is one of the purposes of the present invention cannot be expected.

If it is intended that chemical resistance of the ABS resin is improved, retaining other features thereof, 50 to 99% by weight, preferably 60 to 95% by weight of the ABS resin is necessary.

When the content of the ABS resin is less than 50% by weight, the features of the ABS resin are impaired, and when it is in excess of 99% by weight, the improvement effect of the chemical resistance cannot be expected.

In the present invention, the multi-phase structure thermoplastic resin is used in an amount of 0.1 to 100 parts by weight, preferably 1 to 50 parts by weight, based on 100 parts by weight of the total weight of the resins (I)+ (II). When the amount of the multi-phase structure thermoplastic resin is less than 0.1 part by weight, no compatibility effect is present, impact strength deteriorates, and delamination occurs on molded articles, with the result that the appearance of the articles is degraded. When it is in excess of 100 parts by weight, stiffness and heat resistance of the composition of the present invention deteriorate.

In the present invention, the inorganic filler (IV) can be used in an amount of 1 to 150 parts by weight based on 100 parts of the components (I)+(II)+(III).

The inorganic filler may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates. Inversely, when it is less than 1 part by weight, a modification effect cannot be exerted.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

Furthermore, in the present invention, the thermoplastic resin composition can be brought into a flame resistant state by blending therewith a flame retardant (V) in an amount of 5 to 150 parts by weight based on 100 parts by weight of the thermoplastic resin composition (I)+(II) +(III).

As the flame retardants, there can be used organic flame retardants of halogen series and phosphorus series, and inorganic flame retardants.

The halogen series flame retardants include brominated and chlorinated paraffins such as tetrabromobisphenol (TBA), hexabromobenzene, decabromodiphenyl ether, tetrabromoethane (TBE), tetrabromobutane (TBB) and hexabromocyclodecane (HBCD), chlorine series flame retardants such as chlorinated paraffin, chlorinated polyphenyl, chlorinated polyethylene, chlorinated diphenyl, perchloropentacyclodecane and chlorinated naphthalene, usual halogen series flame retardants such as halogenated diphenyl sulfides, halogenated polystyrenes such as brominated polystyrene, brominated poly-α-methylstyrene and derivatives thereof, halogenated polycarbonates such as brominated polycarbonates, halogenated polyesters such as polyalkylene tetrabromoterephthalate and brominated terephthalic acid series polyesters, halogenated epoxy compounds such as halogenated bisphenol series epoxy resins, halogenated polyphenylene oxide compounds such as poly(dibromophenylene oxide), and high-molecular type halogen-containing polymers such as cyanuric acid ester compounds of halogenated bisphenols.

Of these flame retardants, oligomers and polymers of the aromatic halides are particularly preferred.

In addition, phosphorus series flame retardants include phosphates and halogenated phosphates such as tricresyl phosphate, tri(β-chloroethyl) phosphate, tri(dibromopropyl) phosphate and 2,3-dibromopropyl-2,3-chloropropyl phosphate, phosphonic acid compounds and phosphonic acid derivatives.

Examples of other flame retardants include guanidine compounds such as guanidine nitride.

The above-mentioned organic flame retardants may be used alone or as a mixture of two or more thereof.

The organic flame retardant is used in an amount of 5 to 50 parts by weight, preferably 7 to 40 parts by weight based on 100 parts by weight of the thermoplastic resin composition (I)+(II)+(III). When the content of the flame retardant is less than 5 parts by weight, the flame-resistive effect is poor, and when it is more than 50 parts by weight, the flame resistive effect is not improved any more and cost rises.

These organic flame retardants, particularly halogen series flame retardants can exert a synergistic effect, when used together with a flame resistive auxiliary.

Examples of the flame-resistive auxiliary include antimony halides such as antimony trioxide, antimony pentaoxide, antimony trichloride and antimony pentaoxide, and antimony compounds such as antimony trisulfide, antimony pentasulfide, sodium antimonate, antimony tartrate and metallic antimony.

In addition, examples of the inorganic flame retardants used in the present invention include aluminum hydroxide, magnesium hydroxide, zirconium hydroxide, basic magnesium carbonate, dolonite, hydrotalcite, calcium hydroxide, barium hydroxide, hydrate of stannous hydroxide, hydrates of inorganic metallic compounds of borax and the like, zinc borate, zinc metaborate, barium metaborate, zinc carbonate, magnesum-calcium carbonate, calcium carbonate, barium carbonate, magnesium oxide, molybdenum oxide, zirconium oxide, stannous oxide and red phosphorus. These inorganic flame retardants may be used alone or as a mixture of two or more thereof. Of these flame retardants, hydrates of metallic compounds of aluminum hydroxide, magnesium hydroxide, zirconium hydroxide, basic magnesium carbonate, dolonite, hydrotalcite are particularly preferable. Above all, aluminum hydroxide and magnesium hydroxide are effective as the flame retardants and are economically advantageous.

The particle diameter of the inorganic flame retardant depends upon its kind, but in the cases of aluminum hydroxide and magnesium hydroxide, the average particle diameter is 20 μm or less, preferably 10 μm or less.

The inorganic flame retardant is used in an amount of 30 to 150 parts by weight, preferably 40 to 120 parts by weight based on 100 parts by weight of the thermoplastic resin composition (I)+(II)+(III). When the content of the inorganic flame retardant is less than 30 parts by weight, the flame-resistive effect is poor in its single use, and thus it is necessary to add the organic flame retardant thereto. Inversely, when it is more than 150 parts by weight, impact strength and mechanical strength deteriorate.

In the present invention, the above-mentioned inorganic filler and flame retardant may be employed simultaneously, whereby the content of the flame retardant can be decreased, and other characteristics can be acquired additionally.

In the preparation of the thermoplastic composition of the present invention, melting and mixing are carried out at a temperature of 150 to 350° C., preferably 180° to 320° C.. When the above temperature is less than 150° C., the melting is insufficient, melting viscosity is high, the mixing is poor, and the resin tends to peel off in a layer state. Inversely when it is in excess of 350° C., decomposition and gelation of the resin take place inconveniently.

In melting and mixing, there may be used a usual kneader such as a Banbury mixer, a pressure kneader, a kneading extruder, a biaxial extruder and mixing rolls.

In the present invention, the following materials can be additionally used, in so far as they do not deviate from the gist of the present invention. Examples of such materials include resins such as polyolefin resins, polyvinyl chloride resin, polyvinylidene chloride resin, polyphenylene sulfide resin, polysulfone resin; rubbers such as a natural rubber and a synthetic rubber; and additives such as an antioxidant, an ultraviolet inhibitor, a lubricant, a dispersant, a foaming agent, a crosslinking agent and a colorant.

Now, the present invention will be described in detail in reference to examples.

PREPARATION EXAMPLE 1

(Preparation of Multi-phase Structure Thermoplastic Resin IIIa)

In a 5-liter stainless steel autoclave was placed 2,500 g of pure water, and 2.5 g of polyvinyl alcohol was further dissolved therein as a suspending agent. In the solution was placed 700 g of a polypropylene (trade name Nisseki Polypro J130G; made by Nippon Petrochemicals Co., Ltd.), followed by stirring to suspend the polypropylene therein. Separately, in 300 g of styrene as a vinyl monomer were dissolved 1.5 g of benzoylperoxide as a radical polymerization initiator (trade name Nyper B; made by Nippon Oils & Fats Co., Ltd.) and 6 g of t-butylperoxymethacryloyloxyethyl carbonate as a radical polymerizable or copolymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the polypropylene was impregnated with the vinyl monomer containing the radical polymerization initiator and the radical polymerizable or copolymerizable organic peroxide. After it had been confirmed that the total amount of the impregnated vinyl monomer, radical polymerizable or copolymerizable organic peroxide and radical polymerization initiator was 50% by weight or more of the original total weight thereof, the temperature of the mixture was raised up to a level of 80° to 85° C., and this temperature was then maintained for 7 hours to complete polymerization, followed by water washing and drying, thereby obtaining a graft polymerization precursor IIIa'.

Next, this graft polymerization precursor was extruded at 240° C. by a plastomill monoaxial extruder (Toyo Seiki Seisaku-sho Ltd.) to perform graft reaction, whereby a multi-phase structure thermoplastic resin IIIa was obtained.

This multi-phase structure thermoplastic resin (PP-g PSt) was then observed by a scanning type electron microscope (trade name JEOL JSM T300; made by JEOL, Ltd.), and it was found that it was a multi-phase structure thermoplastic resin in which spherical resin particles each having a diameter of 0.3 to 0.4 μm were uniformly dispersed, as shown in FIG. 1.

In this case, the graft efficiency of the styrene polymer was 77.1% by weight.

PREPARATION EXAMPLE 2

(Preparation of Multi-phase Structure Thermoplastic Resin IIIb)

The same procedure as in Preparation Example 1 was repeated with the exception that 300 g of styrene as the monomer was replaced with 210 g of styrene and 90 g of acrylonitrile as monomers was used, thereby preparing a graft polymerization precursor IIIb'. According to the iodine metory process, the active oxygen amount of this precursor was 0.13% by weight.

Furthermore, when this precursor was extracted with xylene by the use of a Soxhlet extractor, no xylene-insoluble substance was present.

This precursor was then kneaded at 180° C. at 50 rpm for 10 minutes by the use of a plastomill monoaxial extruder as in Preparation Example 1 in order to perform graft reaction. The copolymer which had not been grafted was then extracted from the resulting reaction product with ethyl acetate by the Soxhlet extractor, and a graft efficiency was measured. The graft efficiency of a styrene-acrylonitrile copolymer was 51% by weight. Moreover, extraction was then made with xylene, it was found that the amount of insoluble substances was 12.6% by weight.

PREPARATION EXAMPLE 3

(Preparation of Multi phase Structure Thermoplastic Resin IIIc)

The procedure of Preparation Example 1 was repeated with the exception that the polypropylene (trade name Nisseki Polypro J130G; made by Nippon Petrochemicals Co., Ltd.) was replaced with an ethylene-glycidyl methacrylate copolymer (content of glycidyl methacrylate=15% by weight) (trade name Rexpearl J-3700; Nippon Petrochemicals Co., Ltd.) as an epoxy group-containing ethylene copolymer, in order to obtain a graft polymerization precursor IIIc'. Styrene polymer was then extracted from this graft polymerization precursor with ethyl acetate, and according to GPC, the number average polymerization of the styrene polymer was 900.

Next, this graft polymerization precursor was extruded at 200° C. as in Preparation Example 1, to perform graft reaction, whereby a multi-phase structure thermoplastic resin IIIc was obtained.

This multi-phase structure thermoplastic resin (EGMA-g-PSt) was then observed, and it was found that it had a multi-phase structure in which spherical resin particles each having a diameter of 0.3 to 0.4 μm were uniformly dispersed, as shown in FIG. 2. In this case, the graft efficiency of the styrene polymer was 49.0% by weight.

PREPARATION EXAMPLE 4

(Preparation of Multi-phase Structure Thermoplastic Resin IIId)

The same procedure as in Preparation Example 1 was repeated with the exception that the ethylene-glycidal methacrylate copolymer as the epoxy group-containing ethylene copolymer was replaced with an ethylene-ethyl acrylate copolymer (content of ethyl acrylate=20% by weight) (trade name Rexlon EEA A-4200; made by Nippon Petrochemicals Co., Ltd.), in order to obtain a multi-phase structure thermoplastic resin IIId. In this case, the number average polymerization of a styrene polymer was 900, and an average grain diameter was from 0.3 to 0.4 μm

REFERENCE EXAMPLE 1

(Preparation of Blend)

In a 5-liter reaction tank equipped with a cooling pipe and a thermometer was placed 3 kg of water in which 6 g of a partially saponified polyvinyl alcohol was dissolved, and it was then stirred and heated up to 80° C.. Styrene in which 5 g of benzoyl peroxide was dissolved was added thereto, and polymerizaion was performed for 7 hours. After the polymerization, the resulting polymer was filtered, washed and dried to obtain 950 g of polystyrene. The latter was then mixed with a polypropylene homopolymer (trade name Nisseki Polypro J130G; made by Nippon Petrochemicals Co., Ltd.) under melting. The mixing ratio of polypropylene:polystyrene was 70 parts by weight:30 parts by weight. This melting/mixing process was carried out at 230° C. at a screw revolution speed of 100 rpm by the use of an extruder having a screw diameter of 20 mm and L/D=24 (trade name Labo Plastomill; made by Toyo Seiki Seisaku-sho Ltd.). The resulting composition was observed through an electron microscope, and the results are shown in FIG. 3. In this Figure, particles of the polystyrene are not observed, and fine fibrous peeled layers are seen, which indicates that mixing is not made sufficiently.

EXAMPLES 1 TO 8

A polypropylene homopolymer (trade name Nisseki Polypro J130G; made by Nippon Petrochemicals Co., Ltd.) of MFR 4.0, polybutylene terephthalate (which is represented with PBT in tables given hereinafter) having an intrinsic viscosity of 3.5 dl/g as an aromatic polyester, and multi-phase structure thermoplastic resin IIIa, IIIc and IIId were mixed in ratios shown in Table 1.

The melting/mixing process was carried out by feeding the respective materials into a one-directional twin-screw extruder (made by Plastic Engineering Institute)

and then mixing them under melting in a cylinder thereof. The mixed resin was then formed into granules, and the latter were then dried at 150° C. for 3 hours, followed by injection molding in order to prepare specimens.

Sizes of the specimens and standard tests were as follows:

| | | |
|---|---|---|
| Specimens for notched izod impact strength | 13 × 65 × 6 mm | (JIS K7110) |
| Specimens for heat distortion temperature | 13 × 130 × 6 mm | (JIS K7207) |
| Specimens for flexural strength | 10 × 130 × 4 mm | (JIS K7203) |

State of Delamination:

The state of delamination was ranked as follows by visually observing the state of the broken surface of each molded article.

O: Delamination was not present at all.
Δ: Delamination was slightly present.
X: Delamination was perceptibly present.

TABLE 1

| Example | 1 | 2 | 3 | 4 | 5 | 6 | 7 | 8 |
|---|---|---|---|---|---|---|---|---|
| Polypropylene (wt %) | 90 | 80 | 70 | 70 | 40 | 30 | 30 | 10 |
| PBT (wt %) | 10 | 20 | 30 | 30 | 60 | 70 | 70 | 90 |
| Multi-Phase Structure Themoplastic Resin IIIa* | 10 | 10 | 10 | 10 | 10 | 5 | 5 | 5 |
| Multi-Phase Structure Themoplastic Resin IIIc* | 5 | 5 | 8 | — | 15 | — | 15 | 20 |
| Multi-Phase Structure Themoplastic Resin IIId* | — | — | — | 10 | — | 20 | — | — |
| Notched Izod Impact Strength (kg · cm/cm) | 8 | 10 | 14 | 12 | 18 | 20 | 23 | 21 |
| Heat Distortion Temperature (°C.) (18.6 kg/cm²) | 68 | 70 | 69 | 70 | 67 | 70 | 70 | 69 |
| Flexural Strength (kg/cm²) | 420 | 450 | 490 | 470 | 620 | 650 | 630 | 680 |
| State of Delamination | O | O | O | O | O | O | O | O |

*Parts by weight based on 100 parts by weight of polypropylene + PBT.

EXAMPLES 9 TO 15

The same procedure as in the above-mentioned examples was repeated with the exception that the multiphase structure thermoplastic resin (IIIa) and (IIIc) were replaced with graft polymerization precursors (IIIa'), (IIIc') and (IIId') obtained in Preparation Examples 1, 3 and 4, and the results are set forth in Table 2.

TABLE 2

| Example | 9 | 10 | 11 | 12 | 13 | 14 | 15 |
|---|---|---|---|---|---|---|---|
| Polypropylene (wt %) | 90 | 80 | 40 | 40 | 30 | 20 | 20 |
| PBT (wt %) | 10 | 20 | 60 | 60 | 70 | 80 | 80 |
| Graft Polymerization Precursor (IIIa')* | 10 | 10 | 10 | 10 | 5 | 5 | 5 |
| Graft Polymerization Precursor (IIIc')* | 5 | 5 | 15 | — | 15 | 15 | — |
| Graft Polymerization Precursor (IIId')* | — | — | — | 15 | — | — | 15 |
| Notched Izod Impact Strength (kg · cm/cm) | 8 | 12 | 20 | 17 | 21 | 22 | 20 |
| Heat Distortion Temperature (°C.) (18.6 kg/cm²) | 68 | 64 | 59 | 58 | 52 | 50 | 52 |
| Flexural Strength (kg/cm²) | 400 | 430 | 600 | 560 | 630 | 660 | 610 |
| State of Delamination | O | O | O | O | O | O | O |

*Parts by weight based on 100 parts by weight of polypropylene + PBT.

EXAMPLE 16 TO 24

In these examples, a glass fiber as an inorganic filler was blended in which an average fiber length was 5.0 mm and a fiber diameter was 10 μm. The results are set forth in Table 3.

TABLE 3

| Example | 16 | 17 | 18 | 19 | 20 | 21 | 22 | 23 | 24 |
|---|---|---|---|---|---|---|---|---|---|
| Polypropylene (wt %) | 80 | 70 | 70 | 70 | 30 | 30 | 20 | 20 | 20 |
| PBT (wt %) | 20 | 30 | 30 | 30 | 70 | 70 | 80 | 80 | 80 |
| Multi-Phase Structure Themoplastic Resin IIIa* | 10 | 10 | — | — | 10 | — | 10 | — | — |
| Multi-Phase Structure Themoplastic Resin IIIc* | 10 | 10 | — | — | 10 | — | 15 | — | — |
| Graft Polymerization Precursor (IIIa')* | — | — | 10 | 10 | — | 10 | — | 10 | 10 |
| Graft Polymerization Precursor (IIIc')* | — | — | 10 | — | — | 10 | — | — | — |

TABLE 3-continued

| Example | 16 | 17 | 18 | 19 | 20 | 21 | 22 | 23 | 24 |
|---|---|---|---|---|---|---|---|---|---|
| Graft Polymerization Precursor (IIId')* | — | — | — | 10 | — | — | — | — | 15 |
| Glass Fiber** | 30 | 30 | 30 | 30 | 30 | 30 | 30 | 30 | 30 |
| Notched Izod Impact Strength (kg · cm/cm) | 13 | 16 | 15 | 13 | 16 | 15 | 17 | 17 | 15 |
| Heat Distortion Temperature (°C.) (18.6 kg/cm$^2$) | 130 | 138 | 140 | 135 | 140 | 145 | 159 | 162 | 160 |

*Parts by weight based on 100 parts by weight of polypropylene + PBT.
**Parts by weight based on 100 parts by weight of polypropylene + PBT + multi-phase structure thermoplastic resin (graft polymerization precursor).

EXAMPLES 25 to 30

The same procedure as in Examples 16 and 22 was repeated with the exception that flame retardants and auxiliaries were used, in order to prepare combustion specimens (¼"×½"×5") having compositions shown in Table 4, and vertical flame tests were then carried out in accordance with UL-94 standard

TABLE 4

| Example | 25 | 26 | 27 | 28 | 29 | 30 |
|---|---|---|---|---|---|---|
| Polypropylene (wt %) | 80 | 80 | 80 | 80 | 20 | 20 |
| PBT (wt %) | 20 | 20 | 20 | 20 | 80 | 80 |
| Multi-Phase Structure Themoplastic Resin IIIa*$^1$ | 10 | 10 | 10 | 10 | 10 | 10 |
| Multi-Phase Structure Themoplastic Resin IIIc*$^1$ | 10 | 10 | 10 | 10 | 15 | 15 |
| Glass Fiber*$^2$ | 30 | 30 | 30 | 30 | 30 | 30 |
| Brominated Polystyrene*$^3$ | 5 | 7 | 25 | — | 10 | — |
| Magnesium Hydroxide*$^4$ | — | — | — | 50 | — | 100 |
| Antimony Trioxide | 2 | 2 | 10 | — | 4 | — |
| UL-94 Flame Properties | V-0 | V-0 | V-0 | V-2 | V-0 | V-2 |

*$^1$Parts by weight based on 100 parts by weight of polypropylene + PBT.
*$^2$Parts by weight based on 100 parts by weight of polypropylene + PBT + multi-phase structure thermoplastic resin.

*$^3$ 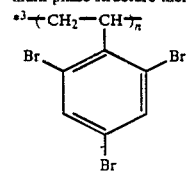

(n = 50)
*$^4$Average grain diameter was 5 μm.

COMPARATIVE EXAMPLES 1 TO 5

The procedure of the above-mentioned examples was repeated with the exception that the blends obtained in Reference Example 2, the ethylene-glycidyl methacrylate copolymer used in Preparation Example 3 and a modified polypropylene (amount of added maleic acid=0.15% by weight). The results are set forth in Table 5.

TABLE 5

| Comp. Example | 1 | 2 | 3 | 4 | 5 |
|---|---|---|---|---|---|
| Polypropylene (wt %) | 40 | 40 | 40 | 40 | 40 |
| PBT (wt %) | 60 | 60 | 60 | 60 | 60 |
| Blend | 10 | — | — | — | — |
| Ethylene-Glycidyl Methacrylate Copolymer | — | 5 | 10 | — | 10 |
| Modified Polypropylene | — | — | — | 25 | 25 |
| Notched Izod Impact Strength (kg · cm/cm) | 2 | 5 | 7 | 6 | 8 |
| Heat Distortion Temperature (°C.) (18.6 kg/cm$^2$) | 49 | 58 | 56 | 54 | 53 |
| Flexural Strength | 500 | 620 | 500 | 510 | 480 |
| State of Delamination | X | X | X | X | O |

*Parts by weight based on 100 parts by weight of polypropylene + PBT.

EXAMPLES 31 TO 36

The procedure of Example 1 was repeated with the exception that the polybutylene terephthalate and multiphase structure thermoplastic resin (IIIa) used therein were replaced with a polycarbonate resin having a number average molecular weight of 62,000 and the multiphase structure thermoplastic resin (IIIb) obtained in Preparation Example 2, and melting/mixing was made in ratios shown in Table 6.

Chemical resistance was then evaluated by immersing each specimen into methanol at 75° C. for 30 days, then drying it at room temperature, measuring the deterioration ratio of tensile strength, and observing the appearance of the specimen.

O: The specimen was not changed.
X: Cracks and dissolution took place on the surface of the specimen.

TABLE 6

| Example | 31 | 32 | 33 | 34 | 35 | 36 |
|---|---|---|---|---|---|---|
| Polypropylene (wt %) | 25 | 25 | 50 | 50 | 80 | 80 |
| Polycarbonate (wt %) | 75 | 75 | 50 | 50 | 20 | 20 |
| Multi-phase Structure Thermoplastic Resin (IIIb)* | 10 | 20 | 10 | 20 | 10 | 20 |
| Notched Izod Impact Strength (kg · cm/cm) | 72 | 80 | 62 | 65 | 45 | 51 |
| Heat Distortion Temperature (°C.) (18.6 kg/cm$^2$) | 127 | 125 | 120 | 117 | 120 | 120 |

TABLE 6-continued

| Example | 31 | 32 | 33 | 34 | 35 | 36 |
|---|---|---|---|---|---|---|
| Chemical Resistance | | | | | | |
| Appearance | O | O | O | O | O | O |
| Detrioration Ratio of Tensile Strength (%) | 10 | 8 | 5 | 5 | 3 | 2 |

*Parts by weight based on 100 parts by weight of polypropylene + polycarbonate.

EXAMPLES 37 TO 40

The procedure of the above-mentioned examples was repeated with the exception that the multi-phase structure thermoplastic resin (IIIb) used therein was replaced with a graft polymerization precursor (IIIb'). The results are set forth in Table 7. Functional effects in these cases are similar to those in cases of the grafted multi-phase structure thermoplastic resins.

TABLE 7

| Example | 37 | 38 | 39 | 40 |
|---|---|---|---|---|
| Polypropylene (wt %) | 25 | 25 | 50 | 80 |
| Polycarbonate (wt %) | 75 | 75 | 50 | 20 |
| Graft Polymerization Precursor (IIIb')* | 10 | 20 | 20 | 20 |
| Notched Izod Impact Strength (kg · cm/cm) | 70 | 83 | 63 | 55 |
| Heat Distortion Temperature (°C.) (18.6 kg/cm$^2$) | 130 | 127 | 115 | 123 |
| Chemical Resistance | | | | |
| Appearance | O | O | O | O |
| Detrioration Ratio of Tensile Strength (%) | 11 | 10 | 6 | 3 |

*Parts by weight based on 100 parts by weight of polypropylene + polycarbonate.

EXAMPLES 41 TO 44

In the above-mentioned examples, a glass fiber having an average fiber length of 3.0 mm and a diameter of 10 μm was additionally blended. The results are set forth in Table 8.

TABLE 8

| Example | 41 | 42 | 43 | 44 |
|---|---|---|---|---|
| Polypropylene (wt %) | 25 | 25 | 50 | 80 |
| Polycarbonate (wt %) | 75 | 75 | 50 | 20 |
| Multi-phase Structure Thermoplastic Resin (IIIb)* | 15 | 25 | 20 | 20 |
| Glass Fiber** | 30 | 30 | 30 | 30 |
| Notched Izod Impact Strength (kg · cm/cm) | 95 | 88 | 80 | 59 |
| Heat Distortion Temperature (°C.) (18.6 kg/cm$^2$) | 145 | 140 | 137 | 125 |

*Parts by weight based on 100 parts by weight of polypropylene + polycarbonate.
**Parts by weight based on 100 parts by weight of polypropylene + PBT + multi-phase structure thermoplastic resin (graft polymerization precursor).

EXAMPLES 45 TO 52

The procedure of Example 1 was repeated with the exception that the polybutylene terephthalate was replaced with 6,6-nylon (trade name Amilan CM3001-N; made by Toray Industries, Inc.), and melting/mixing was made in ratios shown in Table 9. Afterward, physical properties were then measured.

Hygroscopicity was evaluated by immersing each specimen into water at 23° C. for 24 hours, then allowing it to stand at 23° C. at a relative humidity of 65%, and making a calculation on the basis of a weight increment ratio.

Furthermore, coating adhesive properties were evaluated by coating each specimen with an acrylic coating material, applying a cellophane adhesive tape on the surface of the coating material, tearing away it therefrom, and observing a state on the surface.

O: The coating film was not delaminated at all.
Δ: The coating film was partially delaminated.
X: The coating film was substantially all delaminated.

TABLE 9

| Example | 45 | 46 | 47 | 48 | 49 | 50 | 51 | 52 |
|---|---|---|---|---|---|---|---|---|
| Polypropylene (wt %) | 80 | 80 | 60 | 60 | 50 | 30 | 30 | 20 |
| 6,6-Nylon (wt %) | 20 | 20 | 40 | 40 | 50 | 70 | 70 | 80 |
| Multi-phase Structure Thermoplastic Resin (IIIa)* | 10 | 5 | 10 | 10 | 10 | 5 | 5 | 5 |
| Multi-phase Structure Thermoplastic Resin (IIIc)* | 10 | 15 | 10 | — | 10 | 15 | — | 20 |
| Multi-phase Structure Thermoplastic Resin (IIId)* | — | — | — | 10 | — | — | 15 | — |
| Notched Izod Impact Strength (kg · cm/cm) | 18 | 16 | 19 | 17 | 20 | 20 | 22 | 25 |
| Heat Distortion Temperature (°C.) (18.6 kg/cm$^2$) | 70 | 70 | 75 | 77 | 80 | 83 | 81 | 90 |
| Coating Adhesive Properties | O | O | O | O | O | O | O | O |
| Hygroscopicity (%) | 2.5 | 2.5 | 4.0 | 3.8 | 4.5 | 6.2 | 6.6 | 6.5 |

*Parts by weight based on 100 parts by weight of polypropylene + nylon.

EXAMPLES 53 TO 60

In the above-mentioned examples, a glass fiber having an average fiber length of 7.0 mm and a diameter of 10 μm was additionally blended. The results are set forth in Table 10.

TABLE 10

| Example | 53 | 54 | 55 | 56 | 57 | 58 | 59 | 60 |
|---|---|---|---|---|---|---|---|---|
| Polypropylene (wt %) | 80 | 60 | 60 | 50 | 50 | 30 | 30 | 20 |
| 6,6-Nylon (wt %) | 20 | 40 | 40 | 50 | 50 | 70 | 70 | 80 |
| Multi-phase Structure Thermoplastic Resin (IIIa)* | 10 | 10 | 10 | 10 | 10 | 5 | 5 | 5 |
| Multi-phase Structure Thermoplastic Resin (IIIc)* | 10 | 10 | — | 10 | — | 15 | — | 20 |
| Multi-phase Structure Thermo- | — | — | 10 | — | 10 | — | 15 | 1 |

TABLE 10-continued

| Example | 53 | 54 | 55 | 56 | 57 | 58 | 59 | 60 |
|---|---|---|---|---|---|---|---|---|
| plastic Resin (IIId)* | | | | | | | | |
| Glass Fiber | 35 | 35 | 35 | 35 | 35 | 35 | 35 | 35 |
| Notched Izod Impact Strength (kg · cm/cm) | 50 | 47 | 42 | 44 | 42 | 40 | 42 | 40 |
| Heat Distortion Temperature (°C.) (18.6 kg/cm²) | 128 | 135 | 143 | 140 | 138 | 157 | 155 | 165 |

*Parts by weight based on 100 parts by weight of polypropylene + nylon.
**Parts by weight based on 100 parts by weight of polypropylene + nylon + multi-phase structure thermoplastic resin.

EXAMPLES 61 TO 67

In Examples 53 and 54, the same flame retardants and auxiliaries as in Example 25 were additionally blended, and a flame test was then carried out. The procedure of the test was the same as in Example 25. The results are set forth in Table 11.

TABLE 11

| Example | 61 | 62 | 63 | 64 | 65 | 66 | 67 |
|---|---|---|---|---|---|---|---|
| Polypropylene (wt %) | 80 | 80 | 80 | 80 | 80 | 20 | 20 |
| 6,6-Nylon (wt %) | 20 | 20 | 20 | 20 | 20 | 80 | 80 |
| Multi-phase Structure Thermoplastic Resin (IIIa)* | 10 | 10 | 10 | 10 | 10 | 5 | 5 |
| Multi-phase Structure Thermoplastic Resin (IIIc)* | 10 | 10 | — | 10 | 10 | — | 20 |
| Multi-phase Structure Thermoplastic Resin (IIId)* | — | — | 10 | — | — | 20 | — |
| Glass Fiber | 35 | 35 | 35 | 35 | 35 | 35 | 35 |
| Brominated Polystyrene** | 5 | 10 | 10 | 25 | — | 20 | — |
| Magnesium Hydroxide** | — | — | — | — | 100 | — | 100 |
| Antimony Trioxide** | 2 | 5 | 5 | 10 | — | 10 | — |
| UL-94 Flame Properties | V-0 | V-0 | V-0 | V-0 | V-2 | V-0 | V-2 |

*Parts by weight based on 100 parts by weight of polypropylene + nylon.
**Parts by weight based on 100 parts by weight of polypropylene + nylon + multi-phase structure thermoplastic resin.

COMPARATIVE EXAMPLES 6 TO 11

The procedure of Examples 43 was repeated with the exception that the multi-phase structure thermoplastic resin was replaced with a blend and a modified polypropylene, as in Comparative Examples 1 to 5. The results are set forth in Table 12.

TABLE 12

| Comp. Example | 6 | 7 | 8 | 9 | 10 | 11 |
|---|---|---|---|---|---|---|
| Polypropylene (wt %) | 80 | 80 | 80 | 50 | 40 | 30 |
| 6,6-Nylon (wt %) | 20 | 20 | 20 | 50 | 60 | 70 |
| Blend | — | 10 | — | — | — | — |
| Modified Polypropylene | — | — | 25 | 20 | 20 | 20 |
| Notched Izod Impact Strength (kg · cm/cm) | 5 | 6 | 12 | 14 | 15 | 20 |
| Heat Distortion Temperature (°C.) (18.6 kg/cm²) | 60 | 62 | 67 | 77 | 77 | 79 |
| Coating Adhesive Properties | X | X | Δ | O | O | O |
| Hygroscopicity (%) | 3.0 | 3.1 | 2.7 | 4.8 | 5.3 | 6.6 |

*Parts by weight based on 100 parts by weight of polypropylene + nylon.

EXAMPLES 68 TO 75

The procedure of Example 1 was repeated with the exception that the polybutylene terephthalate was replaced with pol-2,6-dimethyl-1,4-phenylene ether (which is represented with PPE in tables), a modified PPE (trade name Nolyl 534J; made by Engineering Plastics Co., Ltd.) and the multi-phase structure thermoplastic resin (IIIa) obtained in Preparation Example 1. The results are set forth in Table 13.

Chemical resistance was evaluated by immersing each specimen into gasoline for 1.5 hours, and then observing its appearance.

O: The specimen was not changed at all.
Δ: The specimen was partially dissolved on its surface.
X: The specimen was remarkably dissolved on its surface.

TABLE 13

| Example | 68 | 69 | 70 | 71 | 72 | 73 | 74 | 75 |
|---|---|---|---|---|---|---|---|---|
| Polypropylene (wt %) | 30 | 30 | 50 | 50 | 80 | 80 | 30 | 80 |
| PPE (wt %) | 70 | 70 | 50 | 50 | 20 | 20 | — | — |
| Modified PPE (wt %) | — | — | — | — | — | — | 70 | 20 |
| Multi-phase Structure Thermoplastic Resin (IIIa)* | 10 | 20 | 10 | 20 | 10 | 20 | 20 | 20 |
| Notched Izod Impact Strength (kg · cm/cm) | 22 | 32 | 25 | 30 | 15 | 20 | 28 | 18 |
| Heat Distortion Temperature (°C.) (18.6 kg/cm²) | 127 | 125 | 120 | 117 | 120 | 120 | 129 | 122 |
| Chemical Resistance | O | O | O | O | O | O | O | O |

*Parts by weight based on 100 parts by weight of polypropylene + PPE.

EXAMPLES 76 TO 82

The procedure of the above-mentioned examples was repeated with the exception that the multi-phase structure thermoplastic resin used therein was replaced with a graft polymerization precursor, and physical properties were then measured. The results are set forth in Table 14.

TABLE 14

| Example | 76 | 77 | 78 | 79 | 80 | 81 | 82 |
|---|---|---|---|---|---|---|---|
| Polypropylene (wt %) | 30 | 30 | 50 | 20 | 20 | 30 | 20 |
| PPE (wt %) | 70 | 70 | 50 | 80 | 80 | 70 | — |
| Modified PPE (wt %) | — | — | — | — | — | — | 80 |
| Graft Polymerization Precursor (IIIa') | 10 | 20 | 20 | 10 | 20 | 20 | 20 |
| Notched Izod Impact Strength (kg·cm/cm) | 20 | 33 | 45 | 55 | 61 | 26 | 58 |
| Heat Distortion Temperature (°C) (18.6 kg/cm$^2$) | 130 | 127 | 115 | 113 | 110 | 130 | 114 |
| Chemical Resistance | O | O | O | O | O | O | O |

*Parts by weight based on 100 parts by weight of polypropylene + PPE.

EXAMPLES 83 TO 89

In the above-mentioned examples, a glass fiber having an average fiber length of 5.0 mm and a diameter of 10 μm was additionally blended. The results are set forth in Table 15.

TABLE 15

| Example | 83 | 84 | 85 | 86 | 87 | 88 | 89 |
|---|---|---|---|---|---|---|---|
| Polypropylene (wt %) | 25 | 25 | 25 | 50 | 80 | 25 | 80 |
| PPE (wt %) | 75 | 75 | 75 | 50 | 20 | — | — |
| Modified PPE (wt %) | — | — | — | — | — | 75 | 20 |
| Multi-phase Structure Thermoplastic Resin (IIIa)* | 15 | 25 | — | 20 | 20 | 20 | 20 |
| Graft Polymerization Precursor (IIIa') | — | — | 25 | — | — | — | — |
| Glass Fiber | 30 | 30 | 30 | 30 | 30 | 30 | 30 |
| Notched Izod Impact Strength (kg·cm/cm) | 42 | 50 | 52 | 45 | 35 | 39 | 28 |
| Heat Distortion Temperature (°C) (18.6 kg/cm$^2$) | 147 | 140 | 135 | 137 | 125 | 135 | 129 |

*Parts by weight based on 100 parts by weight of polypropylene + PPE.
**Parts by weight based on 100 parts by weight of polypropylene + PPE + multi-phase structure thermoplastic resin (graft polymerization precursor).

COMPARATIVE EXAMPLES 12 TO 18

The procedure of the above-mentioned examples was repeated with the exception that the blend obtained in Reference Example 1 was replaced with ethylene-glycidyl methacrylate copolymer and a modified polypropylene (which was obtained by the addition reaction of 0.1% by weight of maleic anhydride to a polypropylene). The results are set forth in Table 16.

TABLE 16

| Comp. Example | 12 | 13 | 14 | 15 | 16 | 17 | 18 |
|---|---|---|---|---|---|---|---|
| Polypropylene (wt %) | 30 | 30 | 50 | 50 | 75 | 30 | 30 |
| PPE (wt %) | 70 | 70 | 50 | 50 | 25 | 70 | 70 |
| Blend | — | — | — | — | — | 15 | — |
| Ethylene-Glycidyl Methacrylate Copolymer | 10 | 15 | — | — | — | — | — |
| Modified Polypropylene | — | — | — | — | — | — | 15 |
| Notched Izod Impact Strength (kg·cm/cm) | 9 | 5 | 11 | 7 | 4 | 2 | 4 |
| Heat Distortion Temperature (°C) (18.6 kg/cm$^2$) | 117 | 110 | 95 | 98 | 91 | 88 | 91 |
| Chemical Resistance | Δ | X | Δ-X | X | Δ-X | X | Δ-X |

*Parts by weight based on 100 parts by weight of polypropylene + PPE.

EXAMPLES 90 TO 97

A polypropylene homopolymer (trade name Nisseki Polypro J130G; made by Nippon Petrochemicals Co., Ltd.) of MFR 4.0, an ABS resin in Table 17 and the multi-phase structure thermoplastic resin (IIIb) obtained in Preparation Example 2 were mixed under melting in a ratio shown in Table 18. The procedure of the melting/mixing process and the measurement manner of mechanical properties were the same as in Example 1.

Coating adhesive properties were evaluated by coating each specimen with an acrylic coating material, applying a cellophane adhesive tape on the surface of the coating material, tearing away it therefrom, and observing a state on the surface. The coating adhesive properties were ranked as follows:

O: The coating film was not delaminated at all.
Δ: The coating film was partially delaminated.
X: The coating film was substantially all delaminated.

Furthermore, chemical resistance was evaluated by immersing each specimen into acetone for 1 hour, then drying it at room temperature, measuring the deterioration ratio of tensile strength, and observing the appearance of the specimen.

O: The specimen was not changed at all.
Δ: The specimen was partially dissolved on its surface.
X: The specimen was remarkably dissolved on its surface.

TABLE 17

| Composition | Sample | |
|---|---|---|
| | ABS Resin [1] | ABS Resin [2] |
| Acrylonitrile (wt %) | 20 | 25 |
| Styrene (wt %) | 55 | 15 |
| α-Methylstyrene (wt) | 0 | 40 |
| Polybutadiene (wt %) | 25 | 20 |
| Intrinsic Viscosity | 0.60 | 0.65 |

TABLE 18

| Example | 90 | 91 | 92 | 93 | 94 | 95 | 96 | 97 |
|---|---|---|---|---|---|---|---|---|
| Polypropylene (wt %) | 25 | 25 | 25 | 50 | 50 | 50 | 80 | 80 |
| ABS Resin [1] (wt %) | 75 | 75 | — | 50 | 50 | — | 20 | — |
| ABS Resin [2] (wt %) | — | — | 75 | — | — | 50 | — | 20 |
| Multi-phase Structure Thermoplastic Resin (IIIb)* | 20 | 10 | 20 | 20 | 10 | 20 | 20 | 20 |
| Notched Izod Impact Strength (kg·cm/cm) | 35 | 27 | 26 | 23 | 20 | 20 | 20 | 17 |
| Heat Distortion Temperature (°C) (18.6 kg/cm$^2$) | 75 | 78 | 75 | 73 | 73 | 75 | 81 | 80 |
| Coating Adhesive Properties | O | O | O | O | O | O | O | O |
| Chemical Resistance | | | | | | | | |
| Appearance | O | O | O | O | O | O | O | O |
| Deterioration Ratio of Tensile Strength (%) | 7 | 8 | 7 | 5 | 5 | 5 | 3 | 2 |

*Parts by weight based on 100 parts by weight of polypropylene + ABS resin.

EXAMPLES 98 to 104

The procedure of the above-mentioned examples was repeated with the exception that the grafted multi-phase structure thermoplastic resin was replaced with the graft polymerization precursor obtained in Preparation Example 2, and that a glass fiber having an average fiber length of 5.0 mm and a diameter of 10 μm was additionally blended. The results are set forth in Table 19.

TABLE 19

| Example | 98 | 99 | 100 | 101 | 102 | 103 | 104 |
|---|---|---|---|---|---|---|---|
| Polypropylene (wt %) | 25 | 50 | 50 | 80 | 80 | 80 | 25 |
| ABS Resin [1] (wt %) | 75 | 50 | — | 20 | — | — | 75 |
| ABS Resin [2] (wt %) | — | — | 50 | — | 20 | 20 | — |
| Multi-phase Structure Thermoplastic Resin (IIIb)* | — | — | — | 20 | 20 | — | 20 |
| Graft Polymerization Precursor (IIIb') | 20 | 20 | 20 | — | — | 20 | — |
| Glass Fiber | — | — | — | 20 | 20 | 20 | 20 |
| Notched Izod Impact Strength (kg · cm/cm) | 24 | 22 | 19 | 17 | 15 | 17 | 18 |
| Heat Distortion Temperature (°C.) (18.6 kg/cm$^2$) | 74 | 74 | 73 | 110 | 108 | 110 | 100 |
| Coating Adhesive Properties | O | O | O | O | O | O | O |
| Chemical Resistance | | | | | | | |
| Appearance | O | O | O | O | O | O | O |
| Deterioration Ratio of Tensile Strength (%) | 9 | 6 | 5 | 3 | 3 | 2 | 2 |

*Parts by weight based on 100 parts by weight of polypropylene + ABS resin.
**Parts by weight based on 100 parts by weight of polypropylene + ABS resin + multi-phase structure thermoplastic resin (graft polymerization precursor).

EXAMPLES 105 TO 112

In Examples 101, 102 and 104, the same flame retardants and auxiliaries as used in Example 25 were additionally used, and a flame test was then carried out. The procedure of the test was the same as in Example 25. The results are set forth in Table 20.

TABLE 20

| Example | 105 | 106 | 107 | 108 | 109 | 110 | 111 | 112 |
|---|---|---|---|---|---|---|---|---|
| Polypropylene (wt %) | 80 | 80 | 80 | 80 | 80 | 25 | 25 | 25 |
| ABS Resin [1] (wt %) | 20 | 20 | 20 | — | — | 75 | 75 | 75 |
| ABS Resin [2] (wt %) | — | — | — | 20 | 20 | — | — | — |
| Multi-phase Structure Thermoplastic Resin (IIIb)* | 20 | 20 | 20 | 20 | 20 | 20 | 20 | 20 |
| Glass Fiber | 30 | 30 | 30 | 30 | 30 | 30 | 30 | 30 |
| Brominated Polystyrene* | — | 10 | 25 | 10 | 25 | — | — | 10 |
| Magnesium Hydroxide** | 100 | — | — | — | — | 50 | 100 | — |
| Antimony Trioxide** | — | 7 | 10 | 7 | 10 | — | — | 10 |
| UL-94 Flame Properties | V-2 | V-0 | V-0 | V-0 | V-0 | V-2 | V-1 | V-0 |

*Parts by weight based on 100 parts by weight of polypropylene + ABS resin.
**Parts by weight based on 100 parts by weight of polypropylene + ABS resin + multi-phase structure thermoplastic resin.

COMPARATIVE EXAMPLES 19 TO 25

The procedure of Examples 90 to 92 was repeated with the exception that the multi-phase structure thermoplastic resin used therein was replaced with the blend obtained in Reference Example 1 and ethylene-vinyl acetate copolymer (content of vinyl acetate=30% by weight). The results are set forth in Table 21.

TABLE 21

| Comp. Example | 19 | 20 | 21 | 22 | 23 | 24 | 25 |
|---|---|---|---|---|---|---|---|
| Polypropylene (wt %) | — | — | 25 | 25 | 25 | 25 | 25 |
| ABS Resin [1] (wt %) | 100 | — | 75 | — | — | 75 | 75 |
| ABS Resin [2] (wt %) | — | 100 | — | 75 | — | — | 75 |
| Blend* | — | — | — | — | — | 20 | 20 |
| Ethylene-Vinyl Acetate Copolymer* | — | — | 15 | 15 | — | — | — |
| Notched Izod Impact Strength (kg · cm/cm) | 18 | 19 | 10 | 11 | 5 | 5 | 6 |
| Heat Distortion Temperature (°C.) (18.6 kg/cm$^2$) | 81 | 82 | 73 | 75 | 77 | 78 | 77 |
| Coating Adhesive Properties | O | O | Δ | Δ | Δ | X | X |
| Chemical Resistance | | | | | | | |
| Appearance | X | X | Δ | Δ | X | X | X |
| Deterioration Ratio of Tensile Strength (%) | 75 | 69 | 43 | 50 | 77 | 85 | 80 |

*Parts by weight based on 100 parts by weight of polypropylene + ABS resin.

The thermoplastic resin composition of the present invention effectively has different features than the raw material resins, and it is excellent in moldability, chemical resistance, impact resistance, heat resistance, coating properties, mechanical properties and appearance of molded articles made therefrom. Degrees of impact strength, heat resistance and mechanical properties can be regulated by suitably selecting the ratio of resins and a multi-phase structure thermoplastic resin which are mixed with one another, and therefore the present invention can meet a variety of demands.

As is apparent from the foregoing, the thermoplastic resin composition of the present invention can be widely utilized as materials for, e.g., automobile parts, electrical and electronic machine parts, and other industrial parts.

What is claimed is:

1. A thermoplastic resin composition consisting essentially of:
   (I) 99 to 1% by weight of a polypropylene, (II) 1 to 99% by weight of at least one resin selected from the group consisting of an aromatic polyester resin, a polycarbonate resin, a polyamide resin, a polyphenylene ether resin, a mixture of the polyphenylene ether resin and a styrene polymer, and an ABS resin, and (III) 0.1 to 100 parts by weight, based on 100 parts by weight of the aforesaid resins (I)+(II), of a multi-phase structure thermoplastic resin which is composed of 5 to 95% by weight of a polyolefin or olefin copolymer and 95 to 5% by weight of a vinyl polymer or copolymer obtained from at least one vinyl monomer, wherein said multi-phase structure thermoplastic resin is a graft polymerization precursor obtained by copolymerizing at least one vinyl monomer and at least one radical polymerizable or copolymerizable organic peroxide in particles of the polyolefin or olefin copolymer, or a multi-phase structure resin obtained by melting and kneading the graft polymerization precursor, and wherein at least one of the components of the multi-phase structure thermoplastic resin is present in a dispersion phase having a particle diameter of 0.001 to 10 μm.

2. A thermoplastic resin composition according to claim 1 wherein the polyolefin or olefin copolymer in the multi-phase structure thermoplastic resin is at least one resin selected from the group consisting of a propylene polymer, an epoxy group-containing ethylene copolymer, an ethylene-unsaturated carboxylic acid or its alkyl ester copolymer, or its metallic salt, and an ethylene-vinyl ester copolymer.

3. A thermoplastic resin composition according to claim 1 wherein the vinyl polymer or copolymer in the multi-phase structure thermoplastic resin has an average polymerization degree of 5 to 10,000.

4. A thermoplastic resin composition according to claim 1 wherein the multi-phase structure thermoplastic resin (III) is a mixture a grafted compound prepared by melting and mixing the mixture, which mixture comprises 1 to 100% by weight of a graft polymerization precursor (A) obtained by copolymerizing at least one vinyl monomer with at least one of radical polymerizable or copolymerizable organic peroxides represented by the following general formulae (a) and (b)

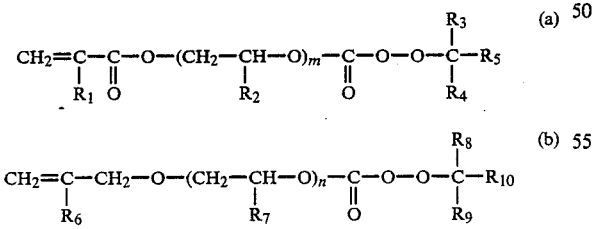

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of a polyolefin or olefin copolymer, 0 to 99% by weight of a polyolefin (B), and 0 to 99% by weight of a vinyl polymer or copolymer (C).

5. A thermoplastic resin composition according to claim 1 wherein the vinyl monomer is at least one vinyl monomer selected from the group consisting of vinyl aromatic monomers, acrylate and methacrylate monomers, acrylonitrile and methacrylonitrile monomers, and vinyl ester monomers.

6. A thermoplastic resin composition according to claim 2 wherein the epoxy group containing ethylene copolymer is a copolymer composed of 60 to 99.5% by weight of ethylene, 40 to 0.5% by weight of glycidyl acrylate or methacrylate, and 0 to 39.5% by weight of another unsaturated monomer.

7. A thermoplastic resin composition according to claim 2 wherein the resin is a copolymer or its' metallic salt which comprises 50 to 99.5% by weight of ethylene, 50 to 0.5% by weight of at least one monomer selected from the group consisting of unsaturated carboxylic acids, their alkyl esters and vinyl esters, and 0 to 49.5% by weight of another unsaturated monomer.

8. A thermoplastic resin composition according to claim 1 wherein the vinyl polymer or copolymer comprises a vinyl monomer in which the content of a vinyl aromatic monomer is 50% by weight or more.

9. A thermoplastic resin composition according to claim 1 containing an inorganic filler in an amount of 1 to 150 parts by weight based on 100 parts by weight of the thermoplastic resin composition (I)+(II)+(III).

10. A thermoplastic resin composition according to claim 1 containing a flame retardant in an amount of 5 to 150 parts by weight based on 100 parts by weight of the thermoplastic resin composition (I)+(II)+III).

11. A method for preparing a thermoplastic resin composition which comprises the step of melting and mixing a polypropylene (I) and at least one resin (II) selected from the group consisting of an aromatic polyester resin, a polycarbonate resin, a polyamide resin, a polyphenylene ether resin or a mixture of the polyphenylene ether resin and a styrene polymer and an ABS resin, with 1 to 100% by weight of a graft polymerization precursor (A) which is obtained by mixing at least one vinyl monomer, at least one radical polymerizable or copolymerizable organic peroxide, a radical polymerization initiator and an aqueous suspension of a polyolefin, heating the suspension under such conditions that the decomposition of the radical polymerization initiator does not occur substantially, in order to impregnate the polyolefin with the vinyl monomer, the radical polymerizable or copolymerizable organic peroxide and the radical polymerization initiator and raising the temperature of this aqueous suspension, when the degree of the impregnation has reached 50% by weight of the original total weight of the vinyl monomer, peroxide and initiator, in order to copolymerize the vinyl monomer with the radical polymerizable or copolymerizable organic peroxide in the polyolefin, 0 to 99% by weight of the polyolefin (B), and 0 to 99% by weight of a vinyl polymer or copolymer (C) obtained by polymerizing at least one kind of vinyl monomer.

12. A method for preparing a thermoplastic resin composition according to claim 11 wherein the radical polymerizable or copolymerizable organic peroxide is at least one peroxycarbonate compound represented by the following general formulae (a) and (b)

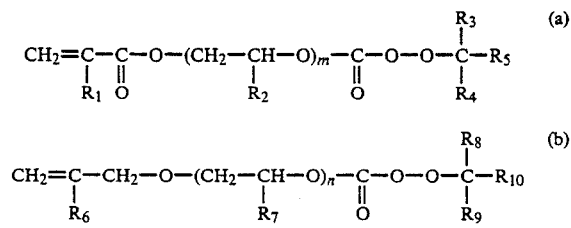

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2.

13. A method for preparing a thermoplastic resin composition according to claim 11 wherein the vinyl polymer or copolymer in the multi-phase structure thermoplastic resin has an average polymerization degree of 5 to 10,000.

14. A method for preparing a thermoplastic resin composition according to claim 11 wherein the polyolefin in the multi-phase structure thermoplastic resin is at least one resin selected from the group consisting of a propylene polymer, an epoxy group-containing ethylene copolymer, an ethylene-unsaturated carboxylic acid or its alkyl ester copolymer, or its metallic salt, and an ethylene-vinyl ester copolymer.

15. A method for preparing a thermoplastic resin composition according to claim 11 wherein the vinyl monomer is at least one vinyl monomer selected from the group consisting of vinyl aromatic monomers, acrylate and methacrylate monomers, acrylonitrile and methacrylonitrile monomers, and vinyl ester monomers.

16. A method for preparing a thermoplastic resin composition according to claim 14 wherein the resin is a copolymer composed of 60 to 99.5% by weight of ethylene, 40 to 0.5% by weight of glycidyl acrylate or methacrylate, and 0 to 39.5% by weight of another unsaturated monomer.

17. A method for preparing a thermoplastic resin composition according to claim 14 wherein the resin is a copolymer or its metallic salt comprises 50 to 99.5% by weight of ethylene, 50 to 0.5% by weight of at least one monomer selected from the group consisting of unsaturated carboxylic acids, their alkyl esters and vinyl esters, and 0 to 49.5% by weight of another unsaturated monomer.

18. A method for preparing a thermoplastic resin composition according to claim 11 wherein the vinyl polymer or copolymer comprises a vinyl monomer in which the content of a vinyl aromatic monomer is 50% by weight or more.

19. A method for preparing a thermoplastic resin composition according o claim 11 wherein an inorganic filler is additionally blended in an amount of 1 to 150 parts by weight based on 100 parts by weight of the thermoplastic resin composition (I)+(II)+(III).

20. A method for preparing a thermoplastic resin composition according to claim 11 wherein a flame retardant is additionally blended in an amount of 5 to 150 parts by weight based on 100 parts by weight of the thermoplastic resin composition (I)+(II)+(III).

21. A method for preparing a thermoplastic resin according to claim 11 wherein components A, B and C are mixed and melted at a temperature of 200° to 300° C., and the resulting resin is mixed and melted with I and II.

* * * * *